United States Patent [19]

Baker

[11] Patent Number: 4,616,894
[45] Date of Patent: Oct. 14, 1986

[54] ELECTRICAL CONNECTOR FOR HOT MELT HOSE UNIT AND GUN

[75] Inventor: Robert G. Baker, Buford, Ga.

[73] Assignee: Nordson Corporation, Amherst, Ohio

[21] Appl. No.: 691,074

[22] Filed: Jan. 14, 1985

[51] Int. Cl.⁴ ............................................. H01R 4/64
[52] U.S. Cl. .................. 339/15; 339/117 P; 339/186 R; 219/301; 174/15 WF
[58] Field of Search ............ 339/15, 16 R, 16 C, 339/16 RC, 117 R, 117 P, 118 R, 118 RY, 186 R, 186 M; 174/15 WF, 47; 219/137 PS, 301, 137.9, 137.61

[56] References Cited

U.S. PATENT DOCUMENTS

| | | |
|---|---|---|
| D. 264,494 | 5/1982 | Chapa . |
| 1,098,620 | 6/1914 | Gillar . |
| 1,230,854 | 6/1917 | Breuer . |
| 1,733,072 | 10/1929 | Pierce . |
| 1,931,703 | 10/1933 | McCrery . |
| 2,208,706 | 7/1940 | Spencer . |
| 3,127,227 | 3/1964 | Edwards ............................... 339/15 |
| 3,419,291 | 12/1968 | Tomb et al. . |
| 3,475,718 | 10/1969 | Hartz ............................... 339/186 M |
| 3,523,269 | 8/1970 | Witek, Jr. et al. . |
| 3,553,629 | 1/1971 | Brown et al. ........................ 339/15 |
| 3,824,523 | 7/1974 | McGhee . |
| 4,039,210 | 8/1977 | Wood et al. . |
| 4,114,929 | 9/1978 | Knapp . |
| 4,236,736 | 12/1980 | Anderson . |
| 4,310,211 | 1/1982 | Bunnell et al. . |
| 4,455,474 | 6/1984 | Jameson et al. . |

FOREIGN PATENT DOCUMENTS 2092092 8/1982 United Kingdom .

Primary Examiner—Gil Weidenfeld
Assistant Examiner—Thomas M. Kline
Attorney, Agent, or Firm—Wood, Herron & Evans

[57] ABSTRACT

An electrical connector for connecting a hot melt applicator to a source of electrical power in a system where molten adhesive is delivered to the applicator through a hose from a remote source of adhesive and where the hose carries wires connected to a remote electrical power source. The connector includes a one piece molded plastic cuff having a through opening such that the cuff can be slid on the end of the hose remote from the source of adhesive, and a plug block housing integral with the cuff including an integral internal plug block having a number of through openings for receiving and retaining the electrical leads which pass radially through the side of the hose. The housing further includes a plug block cavity adapted to be disposed at the outboard end of the hose such that the electrical leads can be easily inserted into the openings in the plug block from the outboard end of the hose in a direction generally along the long axis of the hose. An end cover covers the plug block cavity and keeps the connector from rotating on the end of the hose. The end of the plug block opposite the plug block cavity receives a quick connect-disconnect plug attached to the electrical wiring from the hot melt applicator such that the applicator can be quickly and easily connected to the power source.

2 Claims, 8 Drawing Figures

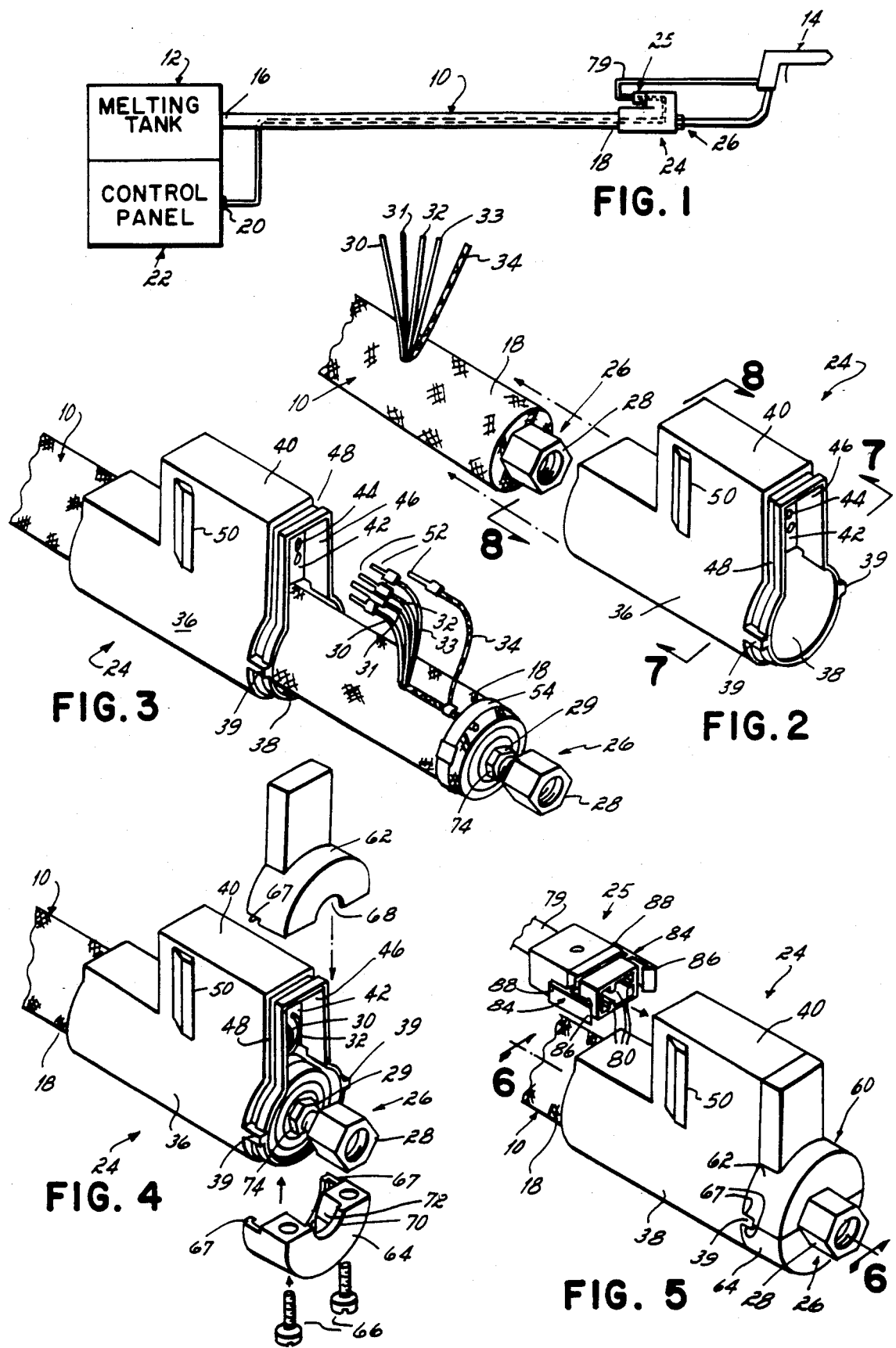

ELECTRICAL CONNECTOR FOR HOT MELT HOSE UNIT AND GUN

BACKGROUND OF THE INVENTION

This invention relates to application of hot melt adhesives and, more particularly, to a connector for connecting a hot melt applicator to a remote source of electrical power for operating the applicator.

Thermoplastic adhesives or so-called "hot melt" adhesives are now widely used to secure substrates together in a great variety of applications. These hot melt materials are essentially solvent free adhesives which are applied in a molten state and form a bond upon cooling to a solid state. By reason of their quick setting characteristics, their adhesive "tack" and their gap filling properties, they are used in many industrial adhesive applications. For example, such adhesives are now commonly used in the assembly and manufacture of automobiles, furniture, aircraft subassemblies and the like. Many of these assembly operations use production line techniques wherein the adhesive applicator must be moved by an operator to and around the assembly part during application of the adhesive to the substrate. In such applications the adhesive is quite commonly applied to the substrate by an adhesive handgun to which the molten adhesive is supplied through a flexible hose. In this type of system, the molten feedstock or molten adhesive is converted from a solid state, e.g., pellets, bulk or chunks, to a molten state by a melter structure such as an electrically heated melting tank remote from the applicator. The molten feedstock is pumped from the melting tank to the gun or dispenser through a feed hose which is heated to a temperature on the order of 350° F. to prevent the molten feedstock from solidifying in the hose as it travels between the melting tank and the applicator. This hose is connected at its end remote from the melting tank to the applicator such that the molten adhesive is delivered to the gun. The gun has an on and off actuation so that the material may be applied as the operator determines.

Since it is necessary for the hot melt adhesive to stay in its molten condition until applied to the substrate, the applicator or gun itself contains a heater as well as a temperature controller in the gun. The heater and temperature controller are typically electrically operated and thus the gun requires the delivery of electrical power to it.

A thermally insulated electrically heated hose for transmitting hot melt adhesive to an applicator is disclosed in U.S. Pat. No. 4,455,474, assigned to the assignee of this invention. That hose as disclosed includes two pair of electrical wires which run along the length of the hose as well as one ground wire. These electrical wires are connected at the end of the hose close to the melting tank to a source of electric power. At the opposite end or end remote from the source of adhesive material and power, the wires extend radially from the side of the hose. A connector for connecting these wires to the applicator is also disclosed comprising a cuff fitting over the end of the hose having a hole or aperture in its side through which the electrical leads pass and a plastic block which is mounted to a boss surrounding the aperture by conventional screws. The electrical leads are drawn up through the aperture and inserted in one end of a conventional electrical plug. The wires are then pushed back into the block and aperture and the plug secured in the block by means of another screw. That block then receives the a plug connection of electrical leads from the gun.

SUMMARY OF THE INVENTION

It has been among the principal objects of this invention to provide an improved electrical connector for connecting a hot melt applicator to electrical leads passing through the side of the hose transmitting the hot melt adhesive to the gun which has an improved design, improved manufacturability and improved ease of use in mounting on the end of the hose. To this end, a presently preferred embodiment of the electrical connector includes a one piece molded plastic cuff having a through opening permitting it to be slid on the end of a hose, a plug block housing integral with the cuff including an integral internal plug block and a plug block cavity, and an end cover for covering the plug block cavity. The plug block includes a plurality of through openings for receiving and retaining the electrical leads at the end of the wires passing from the side of the hose. These leads are inserted through the plug block cavity from the outboard end of the hose and extend therein providing connections for a plug attached to the end of the wires leading to the applicator. The end cap is a two piece member which is slidable in a groove extending about the cuff and plug block housing such that the members mate when slid into position and then may be fastened together with screws. These members include internal surfaces which mate with the surfaces of a hex nut on the outboard end of the hose to thereby prevent rotation of the connector on the end of the hose during use of the applicator. As stated, a plug from the gun is inserted in the inboard end of the plug block housing where the leads therein connect with the leads in the plug block. Integrally molded latch members on the side of the plug block housing interact with spring latches on the gun plug to hold the gun plug in the housing and prevent its accidental dislodgement. These latches may be released by hand pressure to disconnect the gun from the source of electrical power.

The connector of the present invention provides an improved one-piece integrally molded design including cuff, plug block housing and plug block. Thus, the cuff does not need screws or other fasteners to secure it to the hose end nor is it required that the housing be mechanically fastened to the cuff. Access to the plug block is through the outboard end of the cuff through the plug housing cavity. This provides for easy insertion of the electrical leads in the openings in the plug block and for disposing of excess wire length within the cavity. The end cover seals the plug block cavity when mounted to the cuff and housing thereby closing off access to the leads. The end cover includes internal surfaces which mate with the faces of a hex nut mounted on a nipple on the outboard end of the hose to prevent rotation of the connector on the hose end. All in all, the connector of the present invention is easy to install on the hose end and the electrical leads are easily installed in the plug block. The gun plug in turn need merely be inserted in the inboard end of the plug block housing to electrically connect the gun to the electrical leads. A key and slot arrangement in the gun block and plug block respectively, located off the center line of the connector, prevents the plug from being inserted other than in the predetermined manner thus preventing improper connection of the electrical leads.

BRIEF DESCRIPTION OF THE DRAWINGS

FIG. 1 is a schematic illustration showing the arrangement of a hot melt system to which this invention is particularly applicable.

FIG. 2 is a perspective view of the connector of the present invention in position to be slid over the end of the hose.

FIG. 3 is a perspective view showing the connector slid over the end of the hose readied for insertion of the electrical leads in the plug block.

FIG. 4 is a perspective view showing the connector mounted on the hose end in position to receive the end cover.

FIG. 5 is a perspective view showing the completed mounting of the connector on the hose end and the relative location of the gun plug.

DETAILED DESCRIPTION OF THE INVENTION

Figure 6:
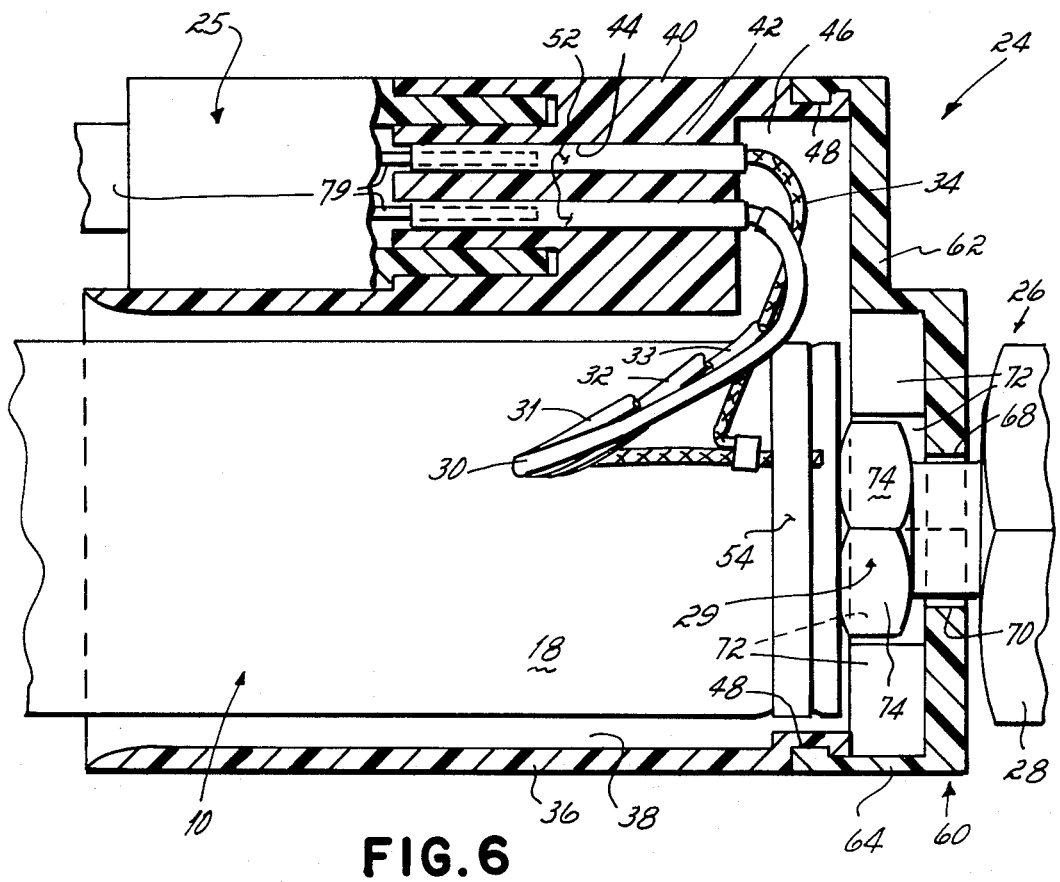
FIG. 6 cross-sectional view taken along line 6—6 of FIG. 5.

Referring first to FIG. 1, there is illustrated in schematic form a thermally insulated electrically heated hose 10 for transporting molten thermoplastic material or so-called "hot melt" adhesive from a melter tank 12 to an applicator or dispensing gun 14. The melter tank or source of molten material is intended to be attached to the unit end 16 of the hose 10, and the dispensing gun 14 is attached to the gun end 18 which is remote from the unit end 16 and the melting tank 12. The unit end 16 of the hose is equipped with an electrical plug 20 which connects the electrical leads of the hose, as explained more full hereinafter, to the control panel 22 at the melter 12. Similarly, the gun end 18 of the hose is equipped with a connector 24 for connecting the electrical leads contained within the hose to a plug 25 connected by electrical leads to the electrical components of the gun 14.

The details of construction of a thermally insulated electrically heated hose for transmitting hot melt adhesive to the gun are set forth in the aforementioned U.S. Pat. No. 4,455,474 and that disclosure is incorporated herein by reference. In general, in accordance with the teachings of that patent, the hose 10 is intended to transport molten adhesive at a pressure of several hundred psi and at a temperature on the order of 250° F. to 350° F. while maintaining the material at that temperature. Additionally, the hose may be required to melt material contained within the hose if the material should cool and solidify as commonly does between shifts or overnight when the dispenser gun with which the hose is utilized is inoperative. Thus, the hose includes electrical resistance heaters contained within the hose and extending the length of the hose. These heaters are covered by insulated material so as to enable the hose to be contacted or touched by the operator of the dispensing gun without any physical harm.

The tube is helically wound with five electrical leads four of these leads are insulated leads and the fifth lead is a braided ground wire which may be covered with an insulative material. Two of the leads are intended to be connected to the heater of the dispensing gun 14 to prevent the hot melt adhesive from solidifying within the gun and two leads are intended to be connected to the temperature controller of the dispensing gun. The ground wire serves to ground the gun. As stated, the opposite ends of these wires are connected to the control panel 22, which serves as a source of electrical power to the gun.

Referring now to FIG. 2, the gun end 18 of the hose 10, i.e., the end remote from the melter 12 is shown. This end of the hose terminates in a nipple 26 (shown in FIG. 3) which is externally threaded for receiving a conventional hydraulic female swivel 28 enabling the hose to be attached to a conventional hot melt gun. A hex nut 29 is threaded on the nipple and lies inboard of the swivel 28. Four leads 30, 31, 32 and 33 and the ground wire 34 pass radially from the side of the hose 10. These leads are connected at the opposite end 20 to the control panel 22 of the melter 12.

Figure 7:
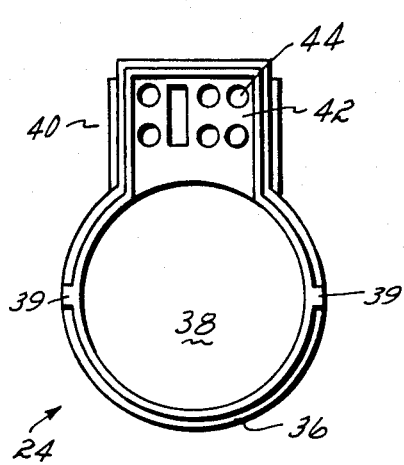
FIG. 7 is an end view taken along line 7—7 of FIG. 2.

The connector 24 includes a one-piece molded plastic cuff 36 having a through opening 38 of a size such that the cuff 36 can be slid on the end 18 of the hose 10. A plug block housing 40 is integrally molded with the cuff 36 as is a plug block 42 interiorly of the plug block housing 40. The plug block 42 includes a plurality of through openings 44 best seen in the end view shown in FIG. 7. A plug block cavity 46 is located at the outboard end of the connector 24. A groove 48 extends about the periphery of the plug block housing 40 and cuff 36 at the outboard end of the connector, interrupted by a pair of ears 39, for mounting of an end cover as will be more fully described. Latch members 50 extend from the outer surface of the plug block housing 40 for securing the gun plug to the connector as will also be more fully explained.

The connector 24 is slid over the end 18 of the hose 10. The leads 30-34 have sufficient resiliency that they are first bent down as the hose 10 passes through the through opening 38. As the connector 24 continues to be slid on the hose 10, the leads pass out from the through opening and spring back generally to an upright position. The exposed wire of the electrical leads 30-34 are all connected to the ends of conventional crimped terminals 52 (FIG. 3). These terminals may be either of the male or female type. However, it is preferred that they be female so when mounted in the plug block 42 there are not "hot" pins sticking out. A conventional metal band 54 is clamped over the end of the hose 10 so as to clamp the hose insulative materials in compression within the band. The terminals 52 are now inserted in predetermined ones of the through openings 44 in the plug block 42 by inserting them from the outboard end of the hose in a direction generally along the long axis of the hose as shown in FIG. 3. (The length of the leads is exaggerated for purposes of clarity of description. Generally, their length is substantially that from the surface of the hose to their respective openings 44.) The terminals 52 preferably include integral spring elements for holding them in the plug block openings 44.

Referring now to FIG. 4, the connector is slid toward the outboard end 18 of the hose 10. In doing so, the excess length of the leads 30-34 extending from the side of the hose is captured in the plug block cavity 46.

An end cover 60 includes two half portions 62 and 64 which slide on the outboard end of the cuff 36 and plug block housing 40 and, when assembled thereon, correspond to the outline thereof. Mounting screws 66 secure the two halves 62, 64 together. Each end cover half 62, 64 has a cutout 67 which define a slot when the two halves are mated into which the ears 39 on the cuff fit on either side to prevent rotation of the cuff relative to the end cover halves. Each end cover further has a semicircular cutout 68, 70, respectively, which when mated form a circular opening surrounding the nipple 26. Interiorly of the cutouts 68 and 70 and on each half of the block is a Y-shaped groove 72. When the end cover 60 is assembled over the end of the hose 10, this Y-shaped groove mates with flats 74 of the hex nut 29 mounted on the nipple 26 to prevent the connector 24 from rotating relative to the hose 10.

Figure 8:
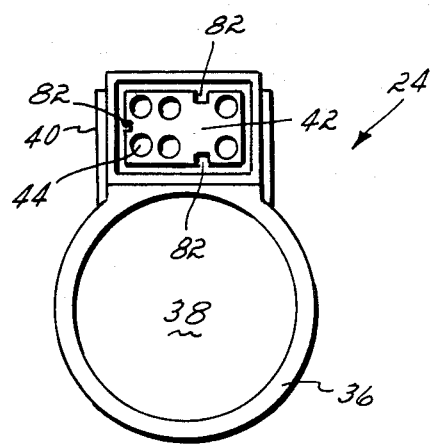
FIG. 8 is an end view taken along line 8—8 of FIG. 2.

The completed assembly of the connector 24 on the hose end is shown in FIGS. 5 and 6. A gun plug 25 is insertable in the plug block housing 40 from inboard side of the connector 24. The gun plug includes electrical leads 79 adapted to connect with the connectors 52 fixed in the openings 44 in the plug block 42. As shown in FIGS. 5 and 8, three keys 80 are provided in the gun plug 25 which slide into grooves 82 in the plug block to insure that the plug block is inserted in the proper orientation to connect the proper leads.

The gun plug includes on either side spring latches 84 which are integrally molded to the body of the plug 25 at a point intermediate their ends so that they are flexible on the plug 25. The forward end 86 is adapted to engage the latch members 50 on the plug block housing 40 to thereby hold the gun plug in mating relationship with the connector 42. To disconnect the gun plug from the connector, it is merely necessary to pinch the rearward ends 88 of the latches 84 between thumb and forefinger thereby flexing the latches outwardly and releasing them from the members 50 whereupon the gun plug 25 can be removed from the housing 40.

As may be appreciated from the foregoing description, the connector 24 of the present invention comprises but a few easily assembleable parts. The cuff 36 is easily installed on the hose 10 merely by slipping the one piece over the hose end. The connection of the electrical leads 30-34 to the plug block 42 is substantially eased by their insertion from the outboard side of the connector along the long axis of the hose after which the connector is slid to the outboard end of the hose and the end cover placed in position to hold the connector on the end of the hose and prevent both axial and rotative movement of the connector with respect to the hose.

Thus having described the invention, what is claimed is:

1. For use in a system where molten material is delivered from a bulk source to a hot melt applicator through a hose, said hose having an end remote from said bulk source of material terminating in an outboard end connectable to the applicator by a nipple, said nipple having a hex nut thereon, and carrying along at least a portion of its length wires connected at one end to a source of electrical power and, at the said remote end, passing radially from the side of the hose and terminating in electrical leads, an electrical connector for connecting the hot melt applicator to the source of electrical power through said wires comprising:

a one-piece molded plastic cuff having a through opening of a size such that said cuff can be slid on said remote end of said hose, a plug block housing integral with said cuff including an integral plug block having a plurality of through openings for receiving and retaining said electrical leads, said leads being adapted to be inserted therein in a direction from the outboard end of said hose generally along the long axis of the hose, and a plug block cavity through which said wires terminating in said leads can pass, said plug block cavity being adapted to be disposed at the outboard end of said hose when said connector is mounted on said remote end of said hose, said cuff and housing having a peripheral groove about said plug block cavity and said cuff through opening and a pair of diametrically opposed ears across said groove, an end cover covering said plug block cavity, said end cover including two portions adapted to mate and be secured together, each said end cover portion including a peripheral flange adapted to slide in said groove and be retained therein, each said peripheral flange having a pair of opposed cutouts such that when said portions are mated said cutouts define a slot capturing said ears to prevent rotation of said cuff and integral housing with respect to said end cover, each said end cover portion further including a Y-shaped slot having a pair of flats adapted to engage the flats on said hex nut to prevent rotation of said end cover and in turn said cuff and integral housing with respect to said hose.

2. The electrical connector of claim 1 wherein said housing further comprises a pair of external latch members adapted to engage spring latch elements on a plug adapted to be received in said plug block housing and wherein said plug block includes a key and slot arrangement for insuring that said end plug is received in said plug block in only a single orientation.

* * * * *